(12) United States Patent
Tsukamoto

(10) Patent No.: US 10,343,667 B2
(45) Date of Patent: Jul. 9, 2019

(54) ELECTRIC BRAKING DEVICE FOR VEHICLE

(71) Applicant: ADVICS CO., LTD., Kariya-shi, Aichi-ken (JP)

(72) Inventor: Shun Tsukamoto, Kariya (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 31 days.

(21) Appl. No.: 15/546,183

(22) PCT Filed: Feb. 25, 2016

(86) PCT No.: PCT/JP2016/055671
§ 371 (c)(1),
(2) Date: Jul. 25, 2017

(87) PCT Pub. No.: WO2016/136895
PCT Pub. Date: Sep. 1, 2016

(65) Prior Publication Data
US 2018/0215369 A1 Aug. 2, 2018

(30) Foreign Application Priority Data
Feb. 25, 2015 (JP) .................. 2015-034741

(51) Int. Cl.
*B60T 7/20* (2006.01)
*B60T 8/88* (2006.01)
(Continued)

(52) U.S. Cl.
CPC ............ *B60T 13/745* (2013.01); *B60T 7/206* (2013.01); *B60T 8/885* (2013.01); *B60T 13/662* (2013.01);
(Continued)

(58) Field of Classification Search
CPC ...... B60T 8/885; B60T 8/4081; B60T 17/221; B60T 2270/402; B60T 2270/414
(Continued)

(56) References Cited

U.S. PATENT DOCUMENTS

| | | | |
|---|---|---|---|
| 2003/0066719 A1* | 4/2003 | Watanabe ............... | B60T 1/005 188/72.7 |
| 2004/0212249 A1* | 10/2004 | Yamaguchi ............. | B60T 13/02 303/122.04 |

(Continued)

FOREIGN PATENT DOCUMENTS

JP 2007-137182 A 6/2007

OTHER PUBLICATIONS

International Search Report (PCT/ISA/210) dated Apr. 5, 2016, by the Japanese Patent Office as the International Searching Authority for International Application No. PCT/JP2016/055671.
(Continued)

*Primary Examiner* — Bradley T King
*Assistant Examiner* — San M Aung
(74) *Attorney, Agent, or Firm* — Buchanan Ingersoll & Rooney PC

(57) ABSTRACT

This electric braking device transmits power generated by an electric motor to a pressing member and causes pressing force to be generated by the pressing member with respect to a friction member. The electric braking device includes a lock mechanism. A locked state (in which movement of a locked section in a direction in which pressing force decreases is impossible) is achieved in the lock mechanism by: performing "supplied power amount reduction control" in which the amount of power supplied to the electric motor is reduced while a locking member is maintained in a lockable position; causing the locked section to move in the direction in which pressing force decreases; and causing the
(Continued)

locking member and the locked section to engage. When performing supplied power amount reduction control, the amount of power supplied is first reduced by a large reduction gradient and then reduced by a small reduction gradient.

5 Claims, 6 Drawing Sheets

(51) Int. Cl.
*B60T 13/66* (2006.01)
*B60T 13/74* (2006.01)
*F16D 65/18* (2006.01)
*F16D 66/00* (2006.01)
*F16D 121/24* (2012.01)
*F16D 125/40* (2012.01)
*F16D 125/48* (2012.01)
*F16D 127/06* (2012.01)
*F16D 129/08* (2012.01)

(52) U.S. Cl.
CPC .............. *B60T 13/74* (2013.01); *F16D 65/18* (2013.01); *F16D 2066/003* (2013.01); *F16D 2066/005* (2013.01); *F16D 2121/24* (2013.01); *F16D 2125/40* (2013.01); *F16D 2125/48* (2013.01); *F16D 2127/06* (2013.01); *F16D 2129/08* (2013.01)

(58) Field of Classification Search
USPC .................................. 303/122.03; 267/64.11
See application file for complete search history.

(56) References Cited

U.S. PATENT DOCUMENTS

| 2005/0217952 | A1* | 10/2005 | Usui | F16D 65/18 188/265 |
| 2005/0258683 | A1* | 11/2005 | Yamaguchi | B60T 1/005 303/89 |
| 2007/0114843 | A1* | 5/2007 | Kawahara | B60T 7/12 303/122 |
| 2010/0051395 | A1* | 3/2010 | Sano | B60T 1/005 188/162 |

OTHER PUBLICATIONS

Written Opinion (PCT/ISA/237) dated Apr. 5, 2016, by the Japanese Patent Office as the International Searching Authority for International Application No. PCT/JP2016/055671.

* cited by examiner

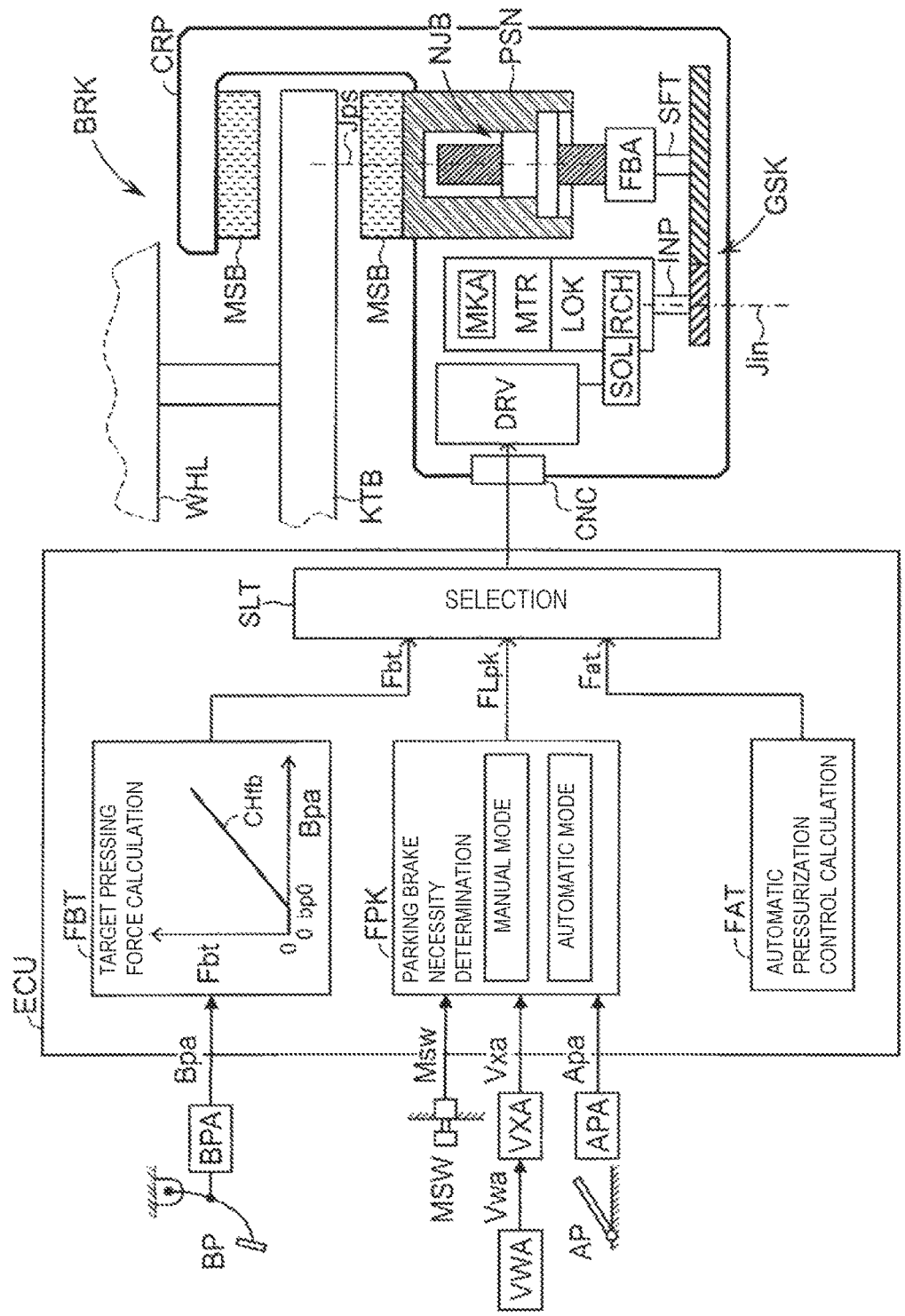
[FIG. 1]

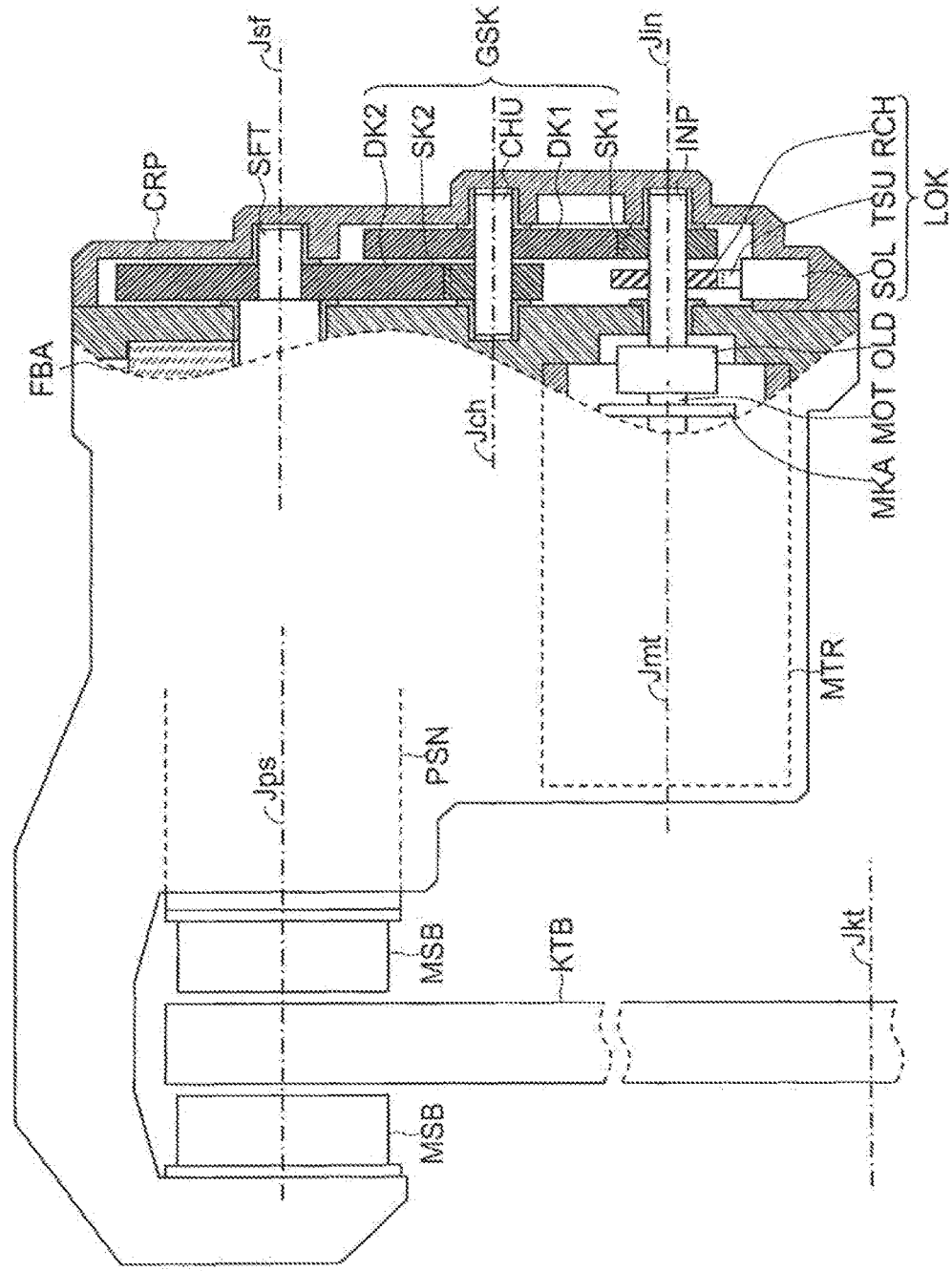

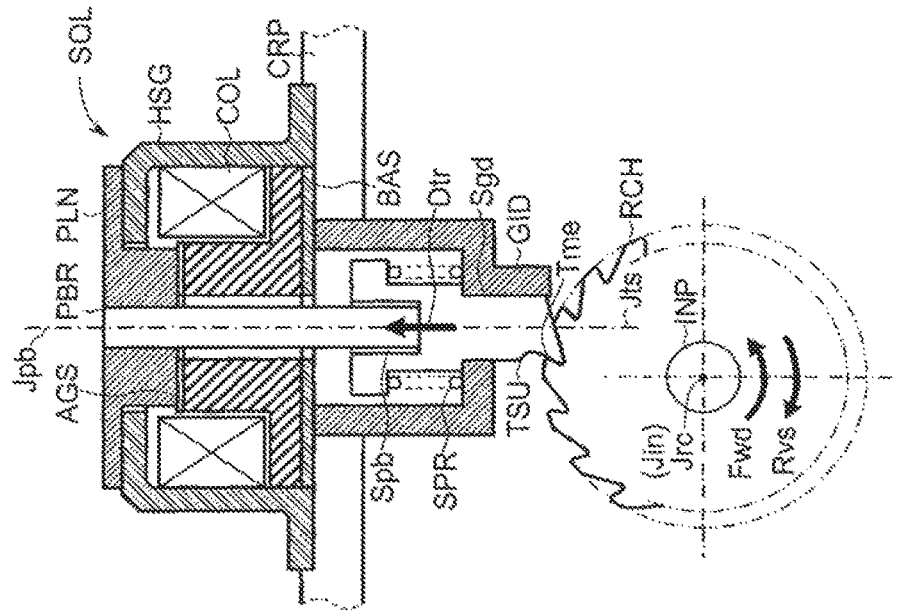
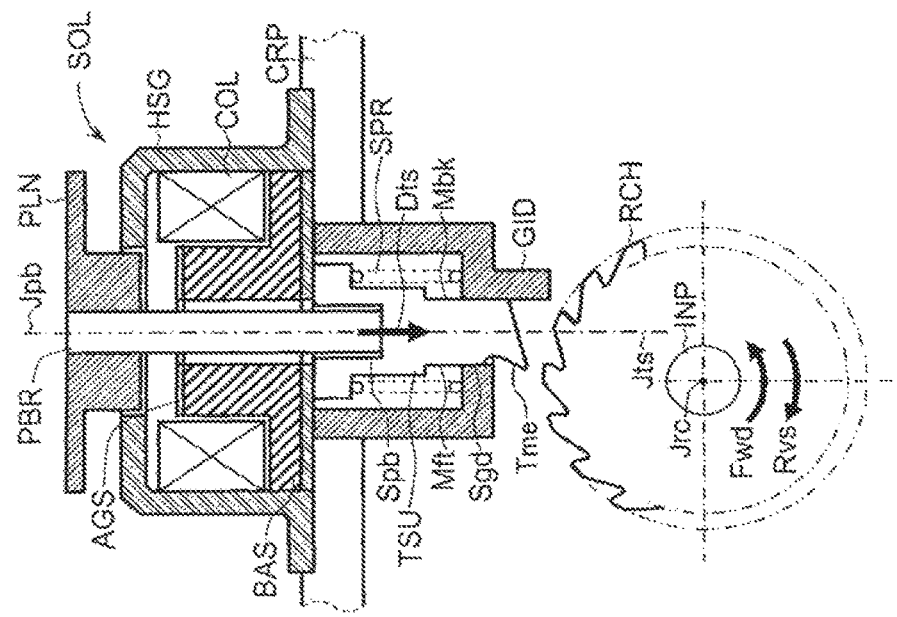
[FIG. 3]

[FIG. 4]
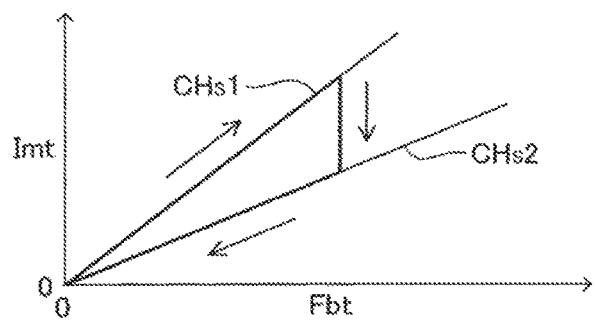
[FIG. 5]
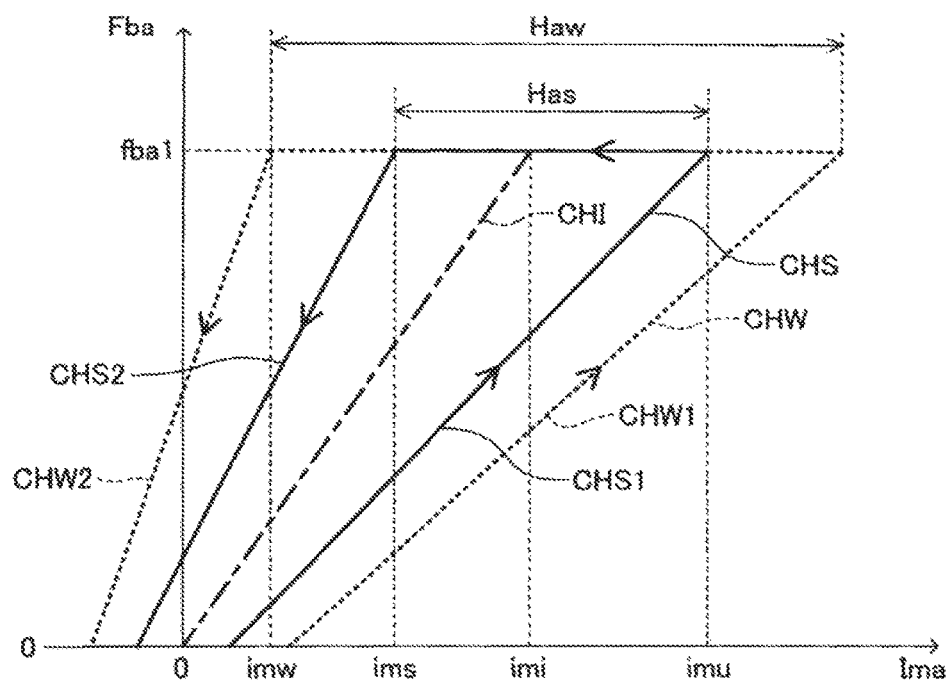

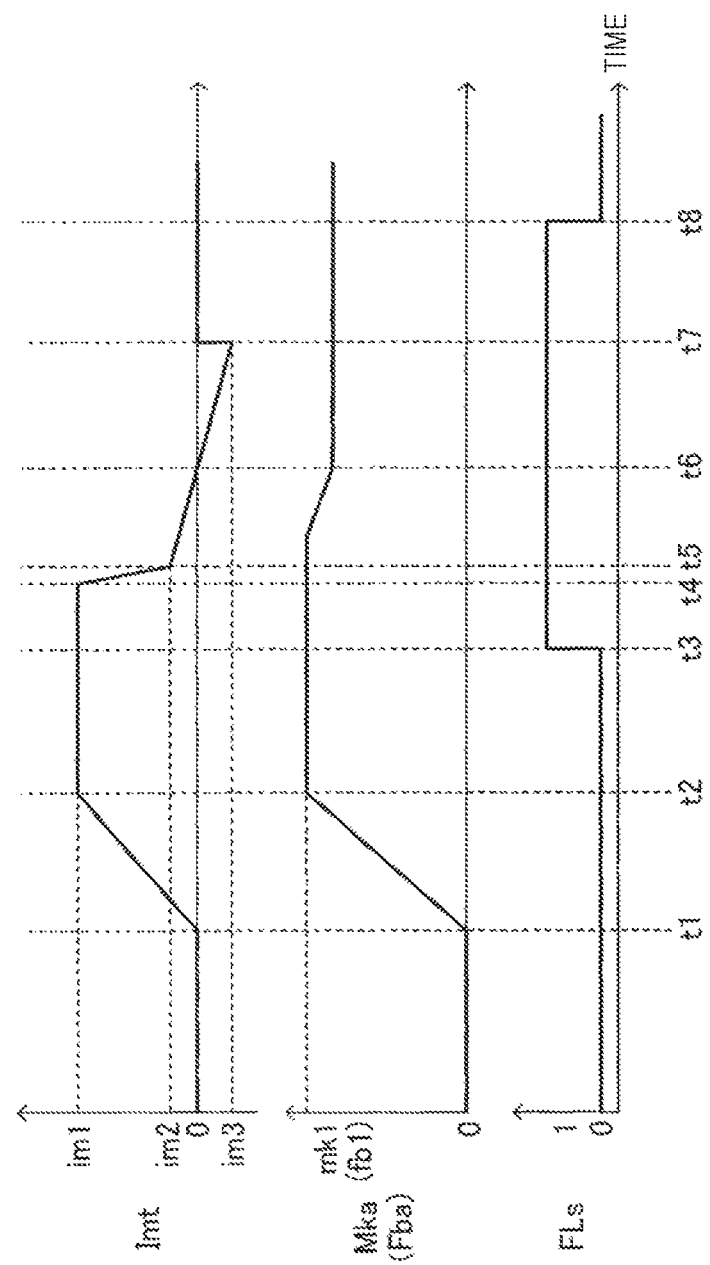

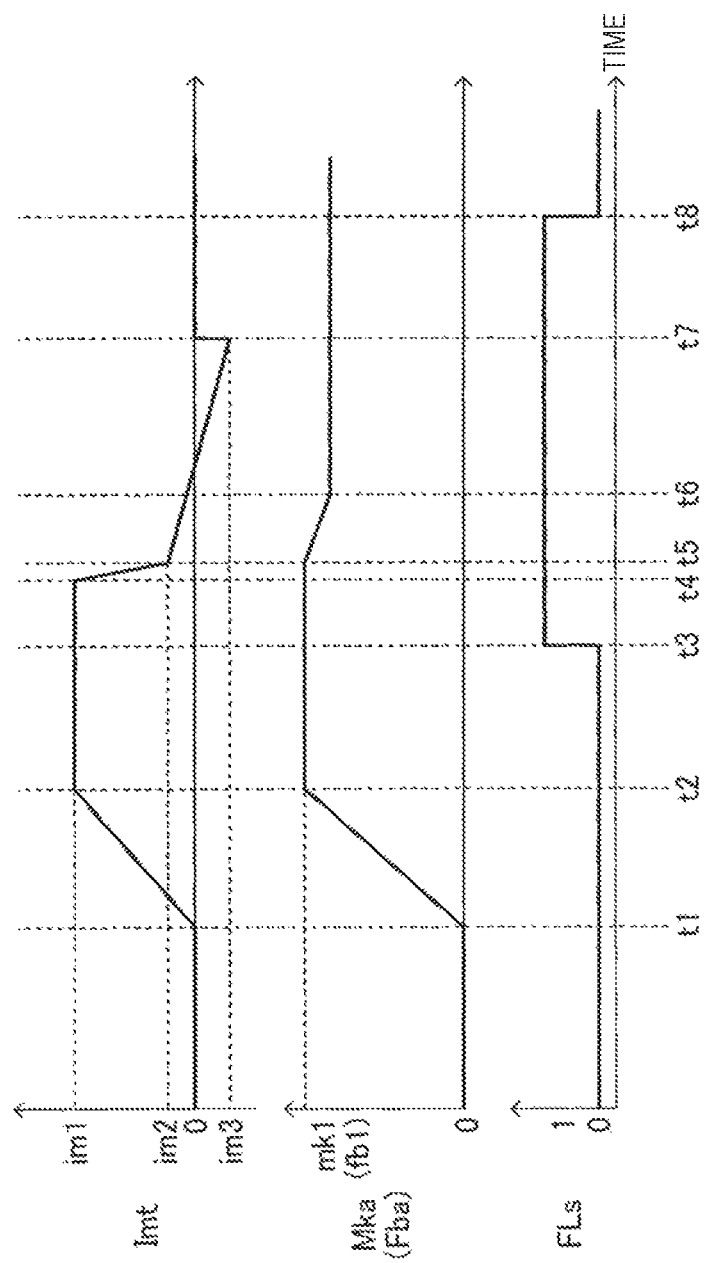

US 10,343,667 B2

ELECTRIC BRAKING DEVICE FOR VEHICLE

TECHNICAL FIELD

The present invention relates to an electric braking device for a vehicle.

BACKGROUND ART

A conventional electric braking device for a vehicle including an "electric motor generating power", a "pressing member (brake piston) pressing a friction member (pad) against a rotating member (brake disk) integrally rotating together with a wheel of a vehicle", a "power transmitting mechanism transmitting the power generated by the electric motor to the pressing member to generate pressing force of the pressing member with respect to the friction member", and a lock mechanism (parking brake mechanism) is known (for example, see Patent Literature 1).

The lock mechanism mentioned here is a mechanism which includes an "engaged part (ratchet gear) integrally moving together with a power transmitting member included in a power transmitting mechanism" and an "engaging member (claw member) selectively moving to an engagement possible position where the engaging member can be engaged with the engaged part and an engagement impossible position where the engaging member cannot be engaged with the engaged part" and achieves a "locked state" (the engaging member is engaged with the engaged part to make the power transmitting member impossible to move in a reducing direction of pressing force). This "locked state" is achieved to achieve the parking brake function.

In the device described in the above literature, when the "locked state" is achieved in a state in which a pressing member presses a friction member, the engaging member is moved from the engagement impossible position to the engagement possible position, and "supplied power amount reduction control" reducing a power supply amount for an electric motor is performed in a state in which the engaging member is kept at the engagement possible position to move the power transmitting member in the reducing direction of the pressing force so as to engage the engaging member with the engaged part.

The literature does not describe a reduction gradient of a power supply amount when "supplied power amount reduction control" is performed (therefore, a movement speed of the power transmitting member in the reducing direction of pressing force) at all.

When the reduction gradient of the power supply amount (therefore, a movement speed of the power transmitting member) is high, a relative movement speed between the engaging member and the engaged part becomes high. Thus, while a time from "start of the supplied power amount reduction control" to "engagement between both the parts" can be shortened, a relatively large impact load is easily generated on both the engaged parts at the moment of the engagement. In contrast to this, when the reduction gradient of the power supply amount (therefore, a movement speed of the power transmitting member) is low, a relative movement speed between the engaging member and the engaged part becomes low. Thus, while a relatively large impact load is hard to be generated on both the engaged parts at the moment of the engagement, a time from "start of the supplied power amount reduction control" to "engagement between both the parts" becomes long.

CITATION LIST

Patent Literature

Patent Literature 1: Unexamined Japanese Patent Publication No. 2007-137182

SUMMARY OF INVENTION

The present invention has been made to cope with the above problems, and has as its object to provide an electric braking device for a vehicle in which at the moment of engagement of an engaging member and an engaged part in a lock mechanism, a relatively large impact load is hard to be generated on both engaged parts, and a time from "start of supplied power amount reduction control" to "engagement between both the parts" becomes short.

The electric braking device for a vehicle according to the present invention includes an electric motor (MTR) generating power, a pressing member (PSN) pressing a friction member (MSB) against a rotating member (KTB) integrally rotating together with a wheel of the vehicle, a power transmitting mechanism (INP, GSK, SFT, NJB) configured to transmit the power generated by the electric motor to the pressing member and cause pressing force (Fba) to be generated by the pressing member with respect to the friction member, a lock mechanism (LOK), and a control means (ECU, DRV, SOL) controlling a power supply amount (Ima) for the electric motor and a position of the engaging member. The lock mechanism includes an engaged part (RCH) integrally moving together with a power transmitting member (INP) included in the power transmitting mechanism and an engaging member (TSU) selectively moving to an engagement possible position where the engaging member can be engaged with the engaged part and an engagement impossible position where the engaging member cannot be engaged with the engaged part and achieves a locked state in which the engaging member is engaged with the engaged part to make the power transmitting member impossible to move in a reducing direction of the pressing force.

When the "locked state" is achieved in a state in which the pressing member presses the friction member, the control means moves the engaging member from the engagement impossible position to the engagement possible position, and performs "supplied power amount reduction control" in a state in which the engaging member is kept at the engagement possible position to move the power transmitting member in the reducing direction of the pressing force so as to engage the engaging member with the engaged part.

As the characteristics of the electric braking device according to the present invention, when the control means performs supplied power amount reduction control, the control means reduces the power supply amount (by feedforward control) to have a first period in which the power supply amount reduces at a first gradient (>0) and a second period in which, after the first period, the power supply amount reduces at a second gradient (>0) smaller than the first gradient.

According to this, the first gradient can be set to be large, and the second gradient can be set to be small. Thus, when "supplied power amount reduction control" is started in a "state in which an engaging member is kept at an engagement possible position and is not engaged with an engaged part", in the short first period, the power supply amount can be largely reduced while a state in which the engaged part does not begin to move due to the presence of hysteresis characteristics in a relationship between the power supply amount and the pressing force (or a state in which the engaged part is rarely moved, i.e., a state in which the engaging member and the engaged part are not engaged with each other) is kept. In addition, in the second period thereafter, the engaged part moves, and a relative movement speed between the engaging member and the engaged part at the moment of engagement between the engaging member and the engaged part is made low. As a result, a relatively large impact load is hard to be generated on both the engaged parts at the moment of the engagement therebetween, and a time from "start of the supplied power amount reduction control" to "engagement between both the parts" can be made short.

More specifically, the control means may be configured such that, in the first period, the power supply amount is reduced to a value determined on the basis of hysteresis characteristics in a relationship between the power supply amount and the pressing force.

According to this, the power supply amount at an end point of time in the first period must be larger than a "minimum value of the power supply amount falling within a range in which a present pressing force can be kept in consideration of the hysteresis characteristics" (this point will be described in detail later). In other words, it may be assured that the engaged part does not begin to move in the first period. Thus, even though the first gradient in the first period is set to a very large value, since it is assured that a situation in which the engaged part begins to be engaged with the engaging member with a high relative movement speed does not occur, the first period can be made very short. As a result, a time from the "start of the supplied power amount reduction control" to the "engagement between both the engaged part and the engaging member" can be further shortened.

Alternatively, the control means includes a position detecting means (MKA) detecting a position (Mka) of the electric motor or a power transmitting member included in the power transmitting mechanism, and is configured such that, while the power supply amount is being reducing in the first period of the supplied power amount reduction control, on the basis of a change of the detected position, the first period is ended to start the second period. Alternatively, the control means includes a pressing force detecting means (FBA) detecting the pressing force (Fba), and may be configured such that, while the power supply amount is being reducing in the first period of the supplied power amount reduction control, on the basis of a change of the detected pressing force, the first period is ended to start the second period.

According to this, immediately after the engaged part begins to move, the first period is ended. In other words, it is assured that the engaged part rarely moves in the first period. Thus, even though the first gradient in the first period is set to a very large value, since it is assured that a situation in which the engaged part begins to be engaged with the engaging member with a high relative movement speed does not occur, the first period can be made very short. As a result, a time from the "start of the supplied power amount reduction control" to the "engagement between both the engaged part and the engaging member" can be further shortened.

In the electric braking device according to the present invention, the control means includes a movement speed detecting means (Mka) detecting a movement speed (dMka/dt) of the power transmitting member, and may be configured such that, when the supplied power amount reduction control is performed, the power supply amount is reduced (by feedback control) to prevent the detected movement speed (>0) of the power transmitting member in a reducing direction of the pressing force from being larger than a predetermined value.

According to this, in a short period after the "supplied power amount reduction control" is started, since the power transmitting member does not begin to move due to the presence of the hysteresis characteristics, the power supply amount sharply reduces due to an increase in feedback amount in the reducing direction of the pressing force in the feedback control. In other words, the reduction gradient of the power supply amount increases. In addition, after the power transmitting member begins to move, the power supply amount is feedback-controlled to prevent the movement speed of the power transmitting member from being larger than the predetermined value (i.e., not to be a larger value). As a result, the reduction gradient of the power supply amount is made low.

In this manner, when the power supply amount is feedback-controlled as described above, consequently, the power supply amount reduces as in the case in which the configuration in which the "power supply amount is feedforward-controlled to have the first period in which the power supply amount reduces at a high first gradient (>0) and the second period in which the power supply amount reduces at a low second gradient (>0)" is employed. That is, a relatively large impact load is hard to be generated on both the engaged parts at the moment of the engagement between the engaging member and the engaged part, and a time from "start of the supplied power amount reduction control" to "engagement between both the parts" can be made short.

BRIEF DESCRIPTION OF THE DRAWINGS

FIG. 1 is an overall diagram of an electric braking device for a vehicle according to an embodiment of the present invention.

FIG. 2 is a partial sectional view for mainly explaining a power transmitting mechanism.

FIG. 3 is a main sectional view for explaining a parking brake mechanism (lock mechanism) LOK.

FIG. 4 is a diagram showing a map regulating a relationship between a target pressing force and a target power supply amount.

FIG. 5 is a graph for explaining a manner of a variation in hysteresis characteristic in a relationship between a power supply amount and a pressing force.

FIG. 6 is a time chart showing an example of supplied power amount reduction control when the parking brake is applied.

FIG. 7 is a time chart showing another example of the supplied power amount reduction control when the parking brake is applied.

DESCRIPTION OF EMBODIMENT

An electric braking device for a vehicle according to an embodiment of the present invention will be described below with reference to the accompanying drawings.
(Configuration)

As shown in FIG. 1, a vehicle having the electric braking device includes a brake operation member BP, an operation amount acquiring means BPA, an acceleration operation member AP, an acceleration operation amount acquiring means APA, a parking brake switch MSW, a wheel speed acquiring means VWA, a vehicle speed acquiring means VXA, an electronic control unit ECU, a braking means (brake actuator) BRK, a rotating member (brake disk) KTB, and a friction member MSB. The electric braking device is disposed for each of the wheels.

The brake operation member (for example, a brake pedal) BP is a member operated by a driver to decelerate the vehicle. Depending on an operation of the brake operation member BP, braking torques of wheels WHL are adjusted by the braking means BRK. The brake operation amount acquiring means BPA is disposed in the brake operation member BP. The BPA acquires (detects) an operation amount (brake operation amount) Bpa of the brake operation member BP by the driver.

As the brake operation amount acquiring means BPA, at least one of a sensor (brake pedal stepping force sensor) detecting operation force of the brake operation member BP and a sensor (brake pedal stroke sensor) detecting a displacement amount of the BP is employed. Thus, the brake operation amount Bpa is calculated on the basis of at least one of brake pedal stepping force and a brake pedal stroke.

The acceleration operation member (for example, an accelerator pedal) AP is a member operated by the driver to accelerate the vehicle. The acceleration operation amount acquiring means APA is disposed in the acceleration operation member AP. The APA acquires (detects) an operation amount (acceleration operation amount) Apa of the acceleration operation member AP by the driver. As the APA, a sensor (throttle position sensor) detecting a throttle position of an engine, and a sensor (accelerator pedal stepping force sensor and accelerator pedal stroke sensor) detecting operation force and/or a displacement amount of the acceleration operation member AP are employed. Thus, an acceleration operation amount Apa is calculated on the basis of at least one of a throttle position, accelerator pedal stepping force, and an accelerator pedal stroke.

The parking brake switch (also simply called a switch) MSW is a manual switch operated by the driver to output a signal Msw to turn on/off (ON/OFF) the switch MSW. The Msw in an on (ON) state designates a parking brake to be operated, and the Msw in an off (OFF) state designates the parking brake to be canceled.

The vehicle speed acquiring means VXA acquires (detects) a speed (vehicle speed) Vxa of a vehicle. The vehicle speed Vxa can be calculated on the basis of a detection signal (wheel speed) Vwa from the wheel speed acquiring means VWA and a known method. For example, the maximum speed of the rotating speeds Vwa of the wheels may be calculated as the vehicle speed Vxa.

The brake operation amount Bpa, the acceleration operation amount Apa, the vehicle speed Vxa, and the designation signal Msw are input to the electronic control unit ECU. The Bpa, the Apa, the Vxa, and the Msw may be calculated or acquired by another electronic control unit and the calculated values (signals) may be transmitted to the electronic control unit ECU through a communication bus.

The electronic control unit ECU is fixed to the vehicle body. In a CPU of the electronic control unit ECU, a target pressing force calculation block FBT, a parking brake necessary/unnecessary determination block FPK, an automatic pressurization control calculation block FAT, and a selecting block SLT are programmed.

In the FBT, on the basis of the Bpa and a preset calculation map CHfb, a target pressing force Fbt related to force (pressing force) pressing the rotating member (brake disk) KTB by the friction member (brake pad) MSB is calculated.

The target pressing force Fbt may be corrected on the basis of vehicle conditions. For example, when the vehicle stops, on the basis of a gradient of a road surface on which the vehicle stops, a lower limit of pressing force necessary to keep the stop state is calculated, and the target pressing force Fbt may be limited such that the target pressing force Fbt does not exceed the calculated lower limit of the pressing force. The calculated Fbt is transmitted to a drive circuit DRV fixed to a wheel side through the SLT.

In the FPK, on the basis of the Msw or the like, it is determined whether a parking brake is necessary/unnecessary. More specifically, a signal FLpk to designate the parking brake to be operated or canceled is determined. "FLpk=0" indicates an unnecessary state of the parking brake, and "FLpk=1" indicates a necessary state of the parking brake. The designation signal FLpk is transmitted to the drive circuit DRV through the SLT.

In a manual mode, on the basis of the operation signal Msw of the manual switch MSW operated by a driver, it is determined whether the parking brake is necessary or unnecessary. For example, the off state of the switch MSW selects the "unnecessary state (FLpk=0) of the parking brake", and the on state of the MSW selects the "necessary state (FLpk=1) of the parking brake".

In an automatic mode, independently of an operation of the switch MSW by the driver, in conjunction with an operation or the like of the acceleration operation member (accelerator pedal) AP, it is automatically determined whether the parking brake is necessary or unnecessary (operated or canceled). More specifically, in the automatic mode, on the basis of the vehicle speed Vxa, the acceleration operation amount Apa, and the like, it is determined whether the parking brake is necessary or unnecessary.

For example, while the vehicle is traveling (Vxa>0), the unnecessary state (FLpk=0) of the parking brake is determined. When the vehicle stops (i.e., Vxa becomes zero), the necessary state of the parking brake is determined to switch the control flag FLpk from "0" to "1". When the driver operates the acceleration operation member AP to make the acceleration operation amount Apa larger than a predetermined value ap1, the unnecessary state of the parking brake is determined to switch the control flag FLpk from "1" to "0".

In FAT, in order to execute automatic pressurization control generating braking force (pressing force) regardless of the operation of the brake operation member BP (even though the BP is not operated), on the basis of signals or the like from various sensors showing conditions of the vehicle, target pressing force Fat related to pressing force is calculated. The automatic pressurization control, typically, is control executed for suppression of skid or slip of the wheels, determination (initial check) whether the device is normal, suppression (hill-hold control) of crawling down of the vehicle on a slope road (climbing road), execution of an automatic hysteresis characteristic detection operation (will be described later), and the like. The calculated Fat is transmitted to the drive circuit DRV through the SLT.

In the SLT, on the basis of the conditions of the vehicle, by one of known selecting methods, any one of the signals Fbt, FLpk, and Fat is selected, and the selected signal is transmitted to the drive circuit DRV.

The braking means (brake actuator) BRK is disposed on each of the wheels WHL to give braking torque to the wheels WHL so as to generate braking force. The vehicle, when traveling, is decelerated by the BRK (functioning as a normal brake). When the vehicle stops, the BRK functions as a parking brake (pressing force increasing means) keeping the stopped state.

As the BRK, the configuration of a so-called disk-type braking device (disk brake) is exemplified. However, in this case, the friction member MSB is a brake pad, and the rotating member KTB is a brake disk. The braking means BRK may be a drum-type braking device (drum brake). In the drum brake, the friction member MSB is a brake shoe, and the rotating member KTB is a brake drum.

The braking means BRK includes a brake caliper CRP, the pressing member PSN, the electric motor MTR, a position acquiring means MKA, a decelerator GSK, a shaft member SFT, a screw member NJB, a pressing force acquiring means FBA, a parking brake lock mechanism LOK, and the drive circuit DRV.

The brake caliper (to also be simply referred to as a caliper) CRP is configured to clip the rotating member (brake disk) KTB through the two friction members (brake pads) MSB. The caliper CRP has a space therein, and various members (drive circuit DRV or the like) are stored in the space.

Inside the caliper CRP, a pressing member (brake piston) PSN is moved (forward or backward) with respect to the rotating member KTB. With the moving of the pressing member PSN, the friction member MSB is pressed against the rotating member KTB to generate frictional force. For example, the PSN has a cylindrical shape and has a central axis Jps. Thus, the PSN moves in the directions of the axis Jps.

The moving of the pressing member PSN is performed by the power of the electric motor MTR. More specifically, an output (rotating power around a motor shaft) of the electric motor MTR is transmitted to the shaft member SFT through the decelerator GSK. The rotating power (torque around the shaft axis) of the shaft member SFT is converted into linear power (thrust in axial directions of the pressing member) by a power converting member NJB, and the linear power is transmitted to the pressing member PSN. As a result, the pressing member PSN is moved (forward or backward) with respect to the rotating member KTB. In this case, the central axis Jps of the PSN coincides with the rotating axis of the SFT.

With the moving of the pressing member PSN, force (pressing force) pressing the rotating member KTB by the friction member MSB is adjusted. Since the rotating member KTB is fixed to each of the wheels WHL, frictional force is generated between the friction member MSB and the rotating member KTB to adjust the braking force of the wheels WHL.

The electric motor MTR is a power source to drive (move) the pressing member PSN. For example, as the electric motor MTR, a brush motor or brushless motor may be employed. In the rotating directions of the electric motor MTR, a forward rotating direction corresponds to a direction (direction in which pressing force increases and braking torque increases) in which the friction member MSB comes close to the rotating member KTB, and a reverse rotating direction corresponds to a direction (direction in which pressing force reduces and braking torque reduces) in which the friction member MSB comes away from the rotating member KTB.

The position acquiring means (for example, a rotating angle sensor) MKA acquires (detects) a position (for example, rotating angle) Mka of a rotor of the electric motor MTR. For example, the MKA is disposed inside the electric motor MTR and on a rotating axis Jmt of the MTR. The detected position (rotating angle) Mka is input to the drive circuit DRV.

An input member INP, the decelerator GSK, the shaft member SFT, and the screw member NJB configure a power transmitting mechanism to transmit power from the electric motor MTR to the pressing member PSN. The input member INP is coaxially coupled to an output shaft MOT of the electric motor MTR through an Oldham's coupling OLD. The GSK decelerates the rotation of the INP to transmit the rotation to the SFT. By the interposition of the decelerator GSK, rotating torque of the SFT is increased to a value obtained by multiplying a rotating torque of the electric motor MTR by a reduction ratio (>1) of the GSK.

As shown in FIG. 2, as the decelerator GSK, a two-speed decelerator may be employed. In the example shown in FIG. 2, first-speed deceleration is performed by a "combination of a small-diameter gear SK1 fixed to the INP and a large-diameter gear DK1 fixed to an intermediate shaft CHU", and second-speed deceleration is performed by a "combination of a small-diameter gear SK2 fixed to the CHU and a large-diameter gear DK2 fixed to the SFT".

With reference to FIG. 1 again, the shaft member SFT is a rotating shaft member to transmit rotating power transmitted from the decelerator GSK to the screw member NJB. The screw member NJB is a power converting mechanism (rotating-linear motion converting member) converting rotating power from the shaft member SFT to linear power. For example, as the NJB, a sliding screw (trapezoidal thread or the like) or a rolling screw (ball screw or the like) may be employed.

The pressing force acquiring means (for example, pressing force sensor) FBA acquires (detects) force (pressing force) Fba pressing the friction member MSB by the pressing member PSN. The detected actual pressing force Fba is input to the drive circuit DRV. For example, the pressing force acquiring means FBA is disposed between the shaft member SFT and the caliper CRP. More specifically, the pressing force acquiring means FBA is disposed on the rotating shaft of the shaft member SFT and fixed to the caliper CRP.

In the example shown in FIGS. 1 and 2, as the power transmitting mechanism, a configuration transmitting the power from the electric motor MTR to the pressing member PSN by using only a mechanical coupling of a plurality of the power transmitting members is employed. However, a configuration transmitting the power from the electric motor MTR to the pressing member PSN by using the mechanical coupling of a plurality of the power transmitting members and a fluid pressure circuit (including a master cylinder) may be employed. More specifically, for example, a configuration in which the fluid pressure circuit including the master cylinder is interposed between the screw member NJB and the pressing member PSN to cause the screw member NJB to pressurize the master cylinder may be employed.

The parking brake mechanism (also called a lock mechanism) LOK is a mechanism which locks the reverse rotation of the electric motor MTR to exert a brake function (so-called parking brake) of keeping a stopped state of the vehicle. As a result, the pressed state of the rotating member KTB by the friction member MSB is kept.

As shown in FIGS. 2 and 3, the lock mechanism LOK may be disposed between the electric motor MTR and the decelerator GSK (i.e., coaxially with the electric motor MTR). In the example shown in FIGS. 2 and 3, the lock mechanism LOK includes a ratchet gear (also called a ratchet) RCH, a claw member TSU, and a solenoid actuator (to also be simply referred to as a solenoid) SOL.

The ratchet gear RCH is fixed to the input member INP coaxially with the INP. The RCH has teeth each having directivity unlike a general gear (for example, a spur gear). The solenoid SOL is fixed to the caliper CRP. In a non-energization state of the solenoid SOL, biasing force of an elastic member (return spring) SPR keeps the claw member TSU at a position (engagement impossible position) where the claw member TSU is unable to be engaged with the ratchet gear RCH (see FIG. 3A).

On the other hand, in an energization state of the SOL, electromagnetic force causing a push bar PBR serving as a part of the solenoid SOL to press the claw member TSU toward the RCH is generated, and the TSU moves to a position (engagement possible position) where the claw member TSU is able to be engaged with the RCH while moving against the biasing force of the SPR and is kept at an engagement possible position (see FIG. 3B). In a state in which the pressing force Fba (>0) of the pressing member PSN is generated and the TSU is kept at the engagement possible position, when a distal end Tme of the TSU is engaged with the teeth of the RCH, rotational motion of the RCH in a reverse rotating direction Rvs becomes impossible. In this manner, moving of the pressing member PSN in a reducing direction of the pressing force Fba becomes impossible. As a result, even though energization to the braking means BRK (electric motor MTR) is stopped, the pressing force Fba is kept to exert a parking brake function.

The drive circuit (electric circuit) DRV is an electric circuit (printed circuit board) driving the electric motor MTR and the solenoid actuator (to also be simply referred to as a solenoid) SOL. The DRV is disposed (fixed) inside the caliper CRP.

(Normal Brake Function)

A normal brake is a brake function of generating braking force depending on an operation of the brake operation member BP by a driver. The normal brake function is exerted by driving the electric motor MTR by the drive circuit DRV on the basis of the Fbt (corresponding to the selected pressing force) when the selecting block SLT selects the target pressing force Fbt.

More specifically, the DRV calculates a target power supply amount Imt on the basis of the target pressing force Fbt determined on the basis of the brake operation amount Bpa and preset calculation characteristics (calculation maps) CHs1 and CHs2 shown in FIG. 4. The target power supply amount Imt is a target value of a power supply amount for the electric motor MTR to achieve the target pressing force Fbt. As shown in FIG. 4, the calculation map of the Imt includes pressure-increasing side characteristics CHs1 and pressure-reducing side characteristics CHs2 in consideration of "hysteresis in a relationship between the power supply amount and the pressing force" in the braking means BRK. The hysteresis will be described later.

The power supply amount is a state quantity (variable) to control an output torque of the electric motor MTR. The electric motor MTR, in order to output a torque being in almost proportion to a current, can use a current target value of the electric motor MTR as the target value of the power supply amount. When a supply voltage to the electric motor MTR increases, a current is increased consequently. For this reason, a supply voltage value may be used as the target power supply amount. Furthermore, since the supply voltage value can be adjusted by a duty ratio in pulse-width modulation, the duty ratio may be used as the power supply amount. In order to correctly control output torque from the MTR, the power supply amount can be corrected or feedback-controlled on the basis of information obtained by a means such as a torque sensor or a current sensor.

The target power supply amount Imt calculated on the basis of the calculation characteristics shown in FIG. 4 may be corrected on the basis of a "feedback amount calculated on the basis of the target pressing force (target value) Fbt calculated by the calculation block FBT (see FIG. 1) and the pressing force (actual value) Fba detected by the pressing force sensor FBA".

A rotating direction of the electric motor MTR is determined on the basis of the sign (positive/negative of the value) of the target power supply amount Imt, and an output (rotating power) of the electric motor MTR is controlled on the basis of the magnitude of the target power supply amount Imt. More specifically, when the sign of the target power supply amount Imt is positive (Imt>0), the electric motor MTR is driven in a forward rotating direction Fwd (increasing direction of the pressing force, see FIG. 3). When the sign of the Imt is negative (Imt<0), the electric motor MTR is driven in the reverse rotating direction Rvs (reducing direction of the pressing force, see FIG. 3). The output torque of the electric motor MTR is controlled such that the larger the absolute value of the target power supply amount Imt is, the larger the output torque of the electric motor MTR becomes; and such that the smaller the absolute value of the Imt is, the smaller the output torque becomes. According to this, the pressing force Fba (therefore, braking force) is adjusted depending on an operation of the brake operation member BP by a driver.

(Parking Brake Function)

The parking brake function is exerted by controlling the electric motor MTR and the solenoid SOL by the drive circuit DRV on the basis of the FLpk when the selecting block SLT selects the designation signal (control flag) FLpk. The parking brake has two operations including a "start operation" which switches the parking brake from an inactive state to an active state and a "cancel operation" which switches the parking brake from the active state to the inactive state. The start and the cancel are determined on the basis of a change (0→1 or 1→0) of the designation signal FLpk.

In the start operation, the solenoid designation signal FLs designating energization to the target power supply amount Imt and the solenoid SOL for the start operation is output. In this case, the target power supply amount Imt for start operation is determined according to preset characteristics. The signal FLs is a control flag. "FLs=0" designates non-energization to the solenoid SOL, and "FLs=1" designates energization to the solenoid SOL.

More specifically, in the start operation, the DRV sets the target power supply amount Imt for start operation to a value (>0) depending on braking force necessary to keep the vehicle in a stopped state on a slope road. On the basis of the target power supply amount Imt (>0) for start operation, the electric motor MTR is driven in the forward rotating direction. In this manner, the pressing force Fba increases to a value (corresponding to the selected pressing force) depending on the braking force necessary to keep the vehicle in the stopped state on the slope road.

Thereafter, the signal FLs is switched from "0" to "1". For this reason, the claw member TSU moves from an "engagement impossible position" (see FIG. 3A) to an "engagement possible position" (FIG. 3B). As described above, in the state in which the pressing force Fba (>0) is generated and the TSU is kept in the engagement possible position, the "supplied power amount reduction control" reducing the target power supply amount Imt is executed to rotate the RCH in the reverse rotating direction Rvs (see FIG. 3). For this reason, the distal end Tme of the TSU is engaged with the teeth of the RCH. With this engagement, rotating motion in the reverse rotating direction Rvs of the RCH becomes impossible, and the pressing force Fba is kept at a present value even though the energization to the electric motor MTR is stopped. Thereafter, the energization to the electric motor MTR is stopped. More specifically, the parking brake function is started/kept.

In the cancel operation, the DRV sets the target power supply amount Imt for cancel operation to a value (>0) necessary to drive the ratchet gear RCH in the forward rotating direction. In a state in which the distal end Tme of the TSU is engaged with the teeth of the RCH, the electric motor MTR is driven in the forward rotating direction on the basis of the target power supply amount Imt for cancel operation. When the RCH rotates in the forward rotating direction Fwd, the engagement between the distal end Tme of the TSU and the teeth of the RCH is canceled. As a result, with biasing force of the elastic member SPR, the TSU returns from the engagement possible position (see FIG. 3B) to the engagement impossible position (see FIG. 3A). According to this, the kept parking brake function is canceled.

(Automatic Pressurization Control Function)

An automatic pressurization control function is a brake function which generates braking force to achieve the above automatic pressurization control. The automatic pressurization control function is exerted by driving the electric motor MTR by the drive circuit DRV on the basis of the Fat (corresponding to the selected pressing force) when the selecting block SLT selects the target pressing force Fat.

More specifically, the DRV, on the basis of the target pressing force Fat, by using one of known methods, the target power supply amount Imt for automatic pressurization control is calculated. The target power supply amount Imt for automatic pressurization control is a target value of a power supply amount for the electric motor MTR to achieve the target pressing force Fat. On the basis of the target power supply amount Imt for automatic pressurization control, an output (rotating power) from the electric motor MTR is controlled. According to this, the pressing force Fba (thus, braking force) is adjusted to achieve the automatic pressurization control.

(Hysteresis Characteristics)

Hysteresis characteristics as shown in FIG. 5 are inevitably generated between a "power supply amount (actual value) Ima for the electric motor MTR" and the "pressing force (actual value) Fba" due to friction or the like of a sliding part inside a "power transmitting mechanism" (the input member INP, the decelerator GSK, the shaft member SFT, and the screw member NJB) in the braking means BRK. As an example, the hysteresis characteristics indicated by a bold solid line in FIG. 5 includes the pressure-increasing side characteristics CHS1 and the pressure-reducing side characteristics CHS2.

The characteristics CHI shown in FIG. 5 here are characteristics (to be referred to as "reference characteristics" hereinafter) uniquely obtained on the basis of only the specifications of the electric motor MTR and the "power transmitting mechanism" when it is assumed that no hysteresis is present between the power supply amount Ima and the pressing force Fba. In the embodiment, the reference characteristics CHI can be expressed by the following Equation (1).

$$Fba = (K \cdot G/L) \cdot Ima \qquad (1)$$

In Equation (1), "K" denotes a torque constant (Nm/A) of the electric motor MTR, "G" denotes a reduction ratio (dimensionless) of the decelerator GSK, and "L" denotes a lead (m/rad) of the screw member NJB.

In general, a frictional coefficient of a sliding part in the "power transmitting mechanism" inevitably varies due to aging, a change in temperature, and the like. Due to a variation or the like of the frictional coefficient, the hysteresis characteristics vary centering around the reference characteristics CHI. More specifically, on the graph shown in FIG. 5, when the frictional coefficient increases, the pressure-increasing side characteristics move from the CHI to the right and the pressure-reducing side characteristics move from the CHI to the left. For example, in a situation in which the hysteresis characteristics indicated by the bold solid line in FIG. 5 can be obtained, when the frictional coefficient increases due to aging, a change in temperature, and the like, as indicated by a broken line in FIG. 5, the pressure-increasing side characteristics of the hysteresis characteristics move from CHS1 to CHW1 and the pressure-reducing side characteristics of the hysteresis characteristics move from CHS2 to CHW2.

(Supplied Power Amount Reduction Control in Start Operation of Parking Brake)

As described above, the "supplied power amount reduction control" in the start operation of the parking brake is started in a state in which the pressing force Fba is adjusted and kept to/at a "value depending on braking force necessary to keep the vehicle in a stopped state". A preferable method of adjusting a reduction gradient of a power supply amount when the "supplied power amount reduction control" is performed (thus, a rotating speed in a reducing direction of pressing force on the ratchet gear RCH) will be discussed below.

When the reduction gradient of the power supply amount (thus, rotating speed of the RCH) is high, a relative movement speed between the distal end Tme of the claw member TSU and the teeth of the RCH becomes high. Thus, while a time from "start of the supplied power amount reduction control" to "engagement between both the parts" can be shortened, a relatively large impact load is easily generated from both the engaged parts at the moment of the engagement. In contrast to this, when the reduction gradient of the power supply amount (therefore, a rotating speed of the RCH) is low, a relative movement speed between the distal end Tme of the claw member TSU and the teeth of the RCH becomes low. Thus, while a relatively large impact load is hard to be generated from both the engaged parts at the moment of the engagement, a time from "start of the supplied power amount reduction control" to "engagement between both the parts" becomes long.

In a state immediately before the "supplied power amount reduction control" is started, i.e., a state in which the pressing force Fba is kept at a "value depending on braking force necessary to keep a vehicle at a stopped state", the power supply amount Ima which can keep the pressing force Fba at a present value due to the presence of a "hysteresis between the power supply amount Ima and the pressing force Fba" has a range depending on hysteresis characteristics. Thus, while the power supply amount Ima reduces "within the range in which the power supply amount Ima can keep the pressing force Fba at the present value", the ratchet gear RCH does not start rotation.

For example, as shown in FIG. 5, when the hysteresis characteristics include the pressure-increasing side characteristics CHS1 and the pressure-reducing side characteristics CHS2, the range of the power supply amount Ima which can keep the pressing force Fba at a value fba1 is expressed by Has (ims to imu). Thus, immediately before the "supplied power amount reduction control" is started, when the pressing force Fba is kept at a value fba1 and the power supply amount Ina is imu, it is secured that the RCH does not begin to rotate until the power supply amount Ima reduces from the imu to the ims.

Thus, while the power supply amount Ima is reducing "within the range in which the power supply amount Ima can keep the pressing force Fba at the present value", even though the reduction gradient of the power supply amount Ima is set to a very large value, it is secured that a situation in which the teeth of the RCH begin to be engaged with the distal end Tme of the TSU at a high relative movement speed does not occur. Therefore, the reduction gradient of the power supply amount Ima during this time is made very high to make it possible to shorten a time required for the "supplied power amount reduction control".

Thereafter, at a stage at which the power supply amount Ima reduces over the "range of the power supply amount Ima can keep the pressing force Fba at the present value", the RCH begins to rotate, and the teeth of the RCH come close to the distal end Tme of the TSU. Thus, at the stage, the reduction gradient of the power supply amount Ima is reduced to make it possible to prevent a relatively large impact load from being generated from both the engaged parts at the moment of engagement between the teeth of the RCH and the distal end Tme of the TSU.

FIG. 6 shows an example obtained when the "supplied power amount reduction control" is executed on the basis of such knowledge. In this example, a start operation of a parking brake is started at time t1. More specifically, after time t1, when the target power supply amount Imt (thus, the power supply amount Ima) is increased from "0", a rotating angle Mka (and the pressing force Fba) of the electric motor MTR also increases from "0" (i.e., the ratchet gear RCH rotates in the forward rotating direction Fwd).

At time t2, when the Imt (thus, Ima) reaches a value Im1 (value depending on braking force necessary to keep the vehicle in the stopped state), the rotating angle Mka (pressing force Fba) also reaches a value mk1 (fb1) depending on braking force necessary to keep the vehicle in the stopped state. After time t2, when the Imt (Ima) is kept at the value Im1, the Mka (Fba) is also kept at the mk1 (fb1).

At time t3, the signal FLs is changed from "0" to "1". In this manner, the claw member TSU which has been kept at the engagement impossible position before time t3 moves to the engagement possible position at time t3 and is kept at the "engagement possible position" after time t3.

At time t4, the "supplied power amount reduction control" is started. After time t4, until time t5 at which the Imt (Ima) reaches a value im2, the Imt (Ima) is reduced at a high reduction gradient, and, after time t5, the Imt (Ima) reduces at a low reduction gradient.

At this time, the Mka (Fba) does not begin to reduce at time t5. More specifically, the value im2, on the basis of the hysteresis characteristics described above, is determined as a value falling within a range in which the ratchet gear RCH does not begin to rotate in the reverse direction Rvs (see FIG. 3). Thus, the reduction gradient of the Imt (Ima) after time t4 may be set to a very large value (at time t4, the Imt (Ima) may reduce from im1 to im2 step by step).

More specifically, for example, when the value fb1 in FIG. 6 corresponds to the value fba1 in FIG. 5, the value im2 may be determined as the value equal to the ims in FIG. 5 or a value slightly larger than the value ims. As the hysteresis characteristics, the hysteresis characteristics (hysteresis characteristics in factory shipment) acquired in advance through a test or the like may be used, or the latest hysteresis characteristics actually acquired each time predetermined time has come may be used.

The value im2 may be determined on the basis of the reference characteristics CHI (see FIG. 5). More specifically, the value im2 may be set to a "value corresponding to the present pressing force Fba in the reference characteristics CHI". Alternatively, the value im2 may be set to a value corresponding to the present pressing force Fba in "characteristics obtained by shifting the reference characteristics CHI by a magnitude corresponding to a range of the minimum hysteresis characteristics within an assumable range in a reducing direction of the power supply amount ima (to the left in FIG. 5)" (i.e., pressure-reducing side characteristics in hysteresis characteristics in which the range of the hysteresis characteristics is minimum within an assumable range).

In this manner, the value im2 can be set on the basis of the "reference characteristics CHI" for the following reason. That is, as described above, due to a variation or the like of a frictional coefficient of a sliding part in the power transmitting mechanism, the hysteresis characteristics vary centering around the "reference characteristics CHI" (in FIG. 5, in the horizontal directions). Thus, the "power supply amount ima corresponding to the present pressing force Fba in the reference characteristics CHI" must be larger than the "minimum value of the power supply amount within a range in which the present pressing force Fba can be kept when the hysteresis characteristics are considered". In other words, when the value Im2 is set to the "value corresponding to the present pressing force Fba in the reference characteristics CHI", a situation in which the RCH begins to rotate in the reverse rotating direction Rvs can be reliably prevented from occurring.

With reference to FIG. 6 again, after a short time has elapsed after time t5, the Mka (Fba) begins to reduce (i.e., the RCH beings to rotate in the reverse rotating direction Rvs). At time t6, the teeth of the RCH are engaged with the distal end Tme of the TSU. As a result, after time t6, the Mka (Fba) is kept constant. After time t5, since the reduction gradient of the Imt (Ima) is low, a relative movement speed between the teeth and the distal end Tme at the moment of engagement of the teeth and the distal end Tme at time t6 is low. Thus, at time t6, a relatively large impact load can be prevented from being generated from the engaged parts of both the members at the moment of engagement of both the parts.

At time t7, when it is determined that a "duration of a state in which Mka (Fba) is kept constant reaches a predetermined time or longer", energization for the electric motor MTR is ended. At time t8 after time t7, the signal FLs is returned from "1" to "0". In this manner, the claw member TSU which has been kept in the "engagement possible position" after time t3 is returned to the "engagement impossible position" at time t8 and kept at the "engagement impossible position" after time t8.

In the example shown in FIG. 6, in a time from time t4 to time t7 in which the "supplied power amount reduction control" is executed, the reduction gradient of the Imt (Ima) is high in a time from time t4 to time t5, and the reduction gradient of the Imt (Ima) is reduced in a time t5 to time t7. As a result, a relatively large impact load is hard to be generated from both the engaged parts at the moment of the engagement between the teeth of the RCH and the distal end Tme of the TSU, and a time from "start of the supplied power amount reduction control" to "engagement between both the parts" can be made short.

More specifically, in the example shown in FIG. 6, the value im2, on the basis of the hysteresis characteristics described above, is determined as a value falling within a range in which the Mka (Fba) does not begin to reduce (i.e., a value falling within the range in which the ratchet gear RCH does not begin to rotate in the reverse direction Rvs). In contrast to this, as shown in FIG. 7, the value im2 may be a value obtained at a time point (time t5) at which it is determined that the Mka (Fba) begins to reduce. In other words, on the basis of the determination in which the Mka (Fba) begins to reduce, the reduction gradient of the Imt (Ima) may be reduced. Also according to this, the same operation and advantage as those in the example shown in FIG. 6 may be exerted.

As described above, in the embodiment, when the "supplied power amount reduction control" is executed, it can be said that "the power supply amount is feedforward-controlled to have a first period in which the power supply amount reduces at a large first gradient (>0) and a second period in which the power supply amount reduces at a small second gradient (>0)".

In contrast to this, when the "supplied power amount reduction control" is executed, the power supply amount may be reduced by feedback control such that a rotating speed of the ratchet gear RCH in the reverse rotating direction Rvs does not exceed a predetermined value (i.e., does not become a large value). The rotating speed of the RCH, for example, may be acquired on the basis of a time derivative value (dMka/dt) of the rotating angle Mka or a time derivative value (dFba/dt) of the pressing force Fba.

According to this, in a short period after the "supplied power amount reduction control" is started, since the RCH does not begin to move due to the presence of the hysteresis characteristics, the power supply amount sharply reduces due to an increase in "feedback amount in the reducing direction of the pressing force Fba" in the feedback control. In other words, the reduction gradient of the power supply amount increases. In addition, after the RCH begins to move, the power supply amount is feedback-controlled to prevent the rotating speed of the RCH from being larger than a predetermined value (i.e., not to be a large value). As a result, the reduction gradient of the power supply amount is made low.

In this manner, when the power supply amount is feedback-controlled as described above, consequently, the power supply amount reduces as in the case in which the configuration in which the "power supply amount is feedforward-controlled to have the first period in which the power supply amount reduces at a high first gradient and a second period in which the power supply amount reduces at a low second gradient" is employed. More specifically, a relatively large impact load is hard to be generated from both the engaged parts at the moment of the engagement between the teeth of the RCH and the distal end Tme of the TSU, and a time from "start of the supplied power amount reduction control" to "engagement between both the parts" can be made short.

As described above, in the embodiment described above, the ratchet gear RCH which rotationally moves is employed as the "engaged part", and the claw member TSU driven by the solenoid SOL is employed as the "engaging member". However, a translationally moving member (for example, the screw member NJB) may be employed as the "engaged part", and a member driven by an electric motor, a piezo-electric actuator, and the like may be employed as the "engaging member".

The invention claimed is:

1. An electric braking device for a vehicle comprising:
   an electric motor generating power;
   a pressing member pressing a friction member against a rotating member integrally rotating together with a wheel of the vehicle;
   a power transmitting mechanism configured to transmit the power generated by the electric motor to the pressing member and cause pressing force to be generated by the pressing member with respect to the friction member;
   a lock mechanism which includes an engaged part integrally moving together with a power transmitting member included in the power transmitting mechanism and an engaging member selectively moving to an engageable position where the engaging member can be engaged with the engaged part and a non-engageable position where the engaging member cannot be engaged with the engaged part and achieves a locked state in which the engaging member is engaged with the engaged part and the power transmitting member is not able to move in a reducing direction of the pressing force; and
   a controller configured to control a power supply amount for the electric motor and a position of the engaging member, wherein
   the controller is configured such that,
   when the locked state is achieved in a state in which the pressing member presses the friction member, the controller moves the engaging member from the non-engageable position to the engageable position, and performs supplied power amount reduction control for reducing the power supply amount for the electric motor in a state in which the engaging member is kept at the engageable position to move the power transmitting member in the reducing direction of the pressing force so as to engage the engaging member with the engaged part, and
   the controller is configured such that,
   when the controller performs the supplied power amount reduction control, the controller reduces the power supply amount to have a first period in which the power supply amount reduces at a first gradient and a second period in which, after the first period, the power supply amount reduces at a second gradient smaller than the first gradient.

2. The electric braking device for a vehicle according to claim 1, wherein
   the controller is configured such that, in the first period, the power supply amount is reduced to a value which is larger than a minimum value of the power supply amount falling within a range in which a present pressing force is kept determined on a basis of hysteresis characteristics in a relationship between the power supply amount and the pressing force.

3. The electric braking device for a vehicle according to claim 1, wherein
   the controller includes a position sensor detecting a position of the electric motor or a power transmitting member included in the power transmitting mechanism, and
   is configured such that, while the power supply amount is being reducing in the first period of the supplied power amount reduction control, on the basis of a change of the detected position, the first period is ended to start the second period.

4. The electric braking device for a vehicle according to claim 1, wherein
the controller includes a pressing force sensor detecting the pressing force, and
is configured such that, while the power supply amount is being reducing in the first period of the supplied power amount reduction control, on the basis of a change of the detected pressing force, the first period is ended to start the second period.

5. An electric braking device for a vehicle comprising:
an electric motor generating power;
a pressing member pressing a friction member against a rotating member integrally rotating together with a wheel of the vehicle;
a power transmitting mechanism configured to transmit the power generated by the electric motor to the pressing member and cause pressing force to be generated by the pressing member with respect to the friction member;
a lock mechanism which includes an engaged part integrally moving together with a power transmitting member included in the power transmitting mechanism and an engaging member selectively moving to an engageable position where the engaging member can be engaged with the engaged part and a non-engageable position where the engaging member cannot be engaged with the engaged part and achieves a locked state in which the engaging member is engaged with the engaged part and the power transmitting member is not able to move in a reducing direction of pressing force; and
a controller configured to control a power supply amount for the electric motor and a position of the engaging member, wherein
the controller is configured such that, when the locked state is achieved in a state in which the pressing member presses the friction member, the controller moves the engaging member from the non-engageable position to the engageable position, and performs supplied power amount reduction control for reducing the power supply amount for the electric motor in a state in which the engaging member is kept at the engageable position to move the power transmitting member in the reducing direction of the pressing force so as to engage the engaging member with the engaged part, and
the controller includes
a movement speed sensor detecting a movement speed of the power transmitting member, and
the controller, when the supplied power amount reduction control is performed, reduces the power supply amount such that the detected movement speed of the power transmitting member in the reducing direction of the pressing force does not exceed a predetermined value.

* * * * *